United States Patent [19]
Allen et al.

[11] Patent Number: 5,261,024
[45] Date of Patent: Nov. 9, 1993

[54] CARD CAGE USED FOR COUPLING TO TELECOMMUNICATIONS MEDIA

[75] Inventors: Dennis Allen, San Ramon; Erling Hansen, Los Altos; Lowell I. Koht, Foster City; Julius J. Moricz, Redwood City; Timothy L. Petro, Sr., Pleasanton, all of Calif.

[73] Assignee: Raynet Corporation, Menlo Park, Calif.

[21] Appl. No.: 991

[22] Filed: Jan. 6, 1993

Related U.S. Application Data

[63] Continuation of Ser. No. 439,898, Nov. 21, 1989, abandoned.

[51] Int. Cl.$^5$ .............................. G02B 6/36
[52] U.S. Cl. ............................ 385/135; 385/134; 385/95; 361/802
[58] Field of Search ............................ 385/95–99, 385/134, 135–137; 361/390, 395, 399, 400, 412, 415; 16/125

[56] References Cited

U.S. PATENT DOCUMENTS

| | | | |
|---|---|---|---|
| 2,953,625 | 9/1960 | Hasselhorn | 174/60 |
| 4,002,386 | 1/1977 | McKenzie | 16/125 X |
| 4,164,362 | 8/1979 | Cobaugh et al. | 361/415 X |
| 4,387,956 | 6/1983 | Cline | 385/136 |
| 4,407,416 | 10/1983 | Anderson | 361/415 X |
| 4,673,246 | 6/1987 | Schembri | 350/96.22 |
| 4,862,320 | 8/1989 | Schmidt et al. | 361/415 X |
| 4,913,522 | 4/1990 | Nolf et al. | 350/96.2 |
| 5,002,356 | 3/1991 | Koht et al. | 350/96.2 |

FOREIGN PATENT DOCUMENTS

| | | |
|---|---|---|
| 159857 | 10/1985 | European Pat. Off. . |
| 204581 | 6/1986 | European Pat. Off. . |
| 271213 | 6/1988 | European Pat. Off. . |

Primary Examiner—John D. Lee
Assistant Examiner—Phan Thi Heartney
Attorney, Agent, or Firm—Dennis E. Kovach

[57] ABSTRACT

A card cage for housing a plurality of circuit boards and passive optical fiber couplers contains a tray for storing express optical fibers or express optical fiber tubes not to be coupled within the card cage but rather expressly routed through a distribution point accommodating the card cage. The tray has a flexible hinge thereon and means for keeping the tray passively deflected away from the optical couplers for facilitating insertion and removal of optical fibers into and from the couplers. A card cage housing snap fits to a card cage base without requiring screws or other physically detachable elements. The housing also includes a plurality of flexible deflectable clips integrally molded as part of the card cage housing which normally keep the circuit cards or boards within the card cage housing but which are deflectable so as to allow the boards to be slideably inserted and removed from channels within the housing for guiding the boards. The card cage further includes a backplane from which a plurality of test pins extend externally from the card cage so as to allow an electrical integrity of the card cage to be easily tested.

20 Claims, 9 Drawing Sheets

FIG_1

FIG_2

FIG_3

FIG_4

FIG_5

FIG_6

FIG_7

FIG_8

FIG_9

FIG_10

CARD CAGE USED FOR COUPLING TO TELECOMMUNICATIONS MEDIA

This application is a continuation of application Ser. No. 07/439,898 filed Nov. 21, 1989, (abandoned), the disclosure of which is incorporated by reference.

CROSS-REFERENCE TO RELATED APPLICATIONS

The present application is related to copending application entitled "Telecommunication Closures" invented by Kaczorowski et al. being filed concurrently herewith and assigned to the assignee of the present invention, the disclosure of which is incorporated herein by reference, that application being directed to and claiming various advantages features of closure constructions illustrated in FIGS. 1-6 herein. The present application claims advantageous features of a card cage illustrated in FIGS. 7-10 herein, a preferred application and use of the card cage being within the closure constructions claimed in the related copending application.

BACKGROUND OF THE INVENTION

The present invention relates to improved environmental closure constructions and accessories useable for environmentally protecting communication cables, preferably optical fiber cables.

In recent years optical fiber communication networks have gained wide acceptance as opposed to the use of alternate electrical cable systems due to the significantly enhanced bandwidth capabilities available for optical fiber and its immunity to electromagnetic and radiomagnetic interference. Though very significant advantages are achievable by the use of optical fiber rather than electrical conduction media, a continuing problem with the deployment of optical fiber systems relates to how optical fiber cables can be terminated so as to make electrical or optical connections to fibers within the cables and yet adequately environmentally protect the cables and allow for craft friendly installation. The present invention is directed to various improved constructions for facilitating the termination of optical fiber cables, optically connecting fibers within the cables, protecting optical fibers not to be optically coupled at a subscriber drop point, and environmentally sealing the optical fiber cable after it has been entered for coupling or breakout purposes.

SUMMARY OF THE INVENTION

It is an object of the present invention to provide an improved card cage or improved housing which is capable of being conveniently used for coupling to telecommunications media contained within a telecommunications cable and which can house electrical and optical components therein.

More specifically, one object of the present invention is to provide a card cage which is suitable for use with an optical fiber cable wherein an intermediate section of the optical fiber cable is stripped to as to expose individual optical fibers therein, and/or loose tubes held within the cable which themselves contain loosely therein one or more optical fibers.

The card cage of the present invention has several novel and advantageous features. The card cage includes a molded housing which includes a plurality of molded opposed longitudinal channels, each opposing pair of which is sized so as to suitably guide opposite lengthwise longitudinal edges of a board, e.g. a printed circuit card or similar item, the channels allowing the boards to be slideably inserted and removed from the card cage. A backplane is electrically configured so as to be in communication with all desired opto-electronic elements to be housed within the card cage, the backplane then being connected to a plurality of electrical test pins extending outward from a housing of the card cage, the test pins so disposed being useable for testing an electrical integrity of the backplane, the housing, and any boards disposed within the housing prior to using the card cage in a commercial environment.

A further feature of the invention is the provision of securing means for securing one or more optical fiber couplers to the housing in conjunction with means for storing an excess length of optical fiber to be engaged with any one of the couplers such that the fiber excess length is not bent about a radius of curvature which is less than its minimum bend radius outside the couplers, the card cage including an optical fiber bypass tray for storing a length of one or more express optical fibers not to be coupled to any one of the optical couplers. Preferably, tray includes a flexible elongated resilient hinge near one end of the tray, the hinge allowing the tray to be deflected away from the housing about any desired angle, e.g. in excess of 30° or 40°, the elongated flexible hinge being constructed such that when the tray is so deflected none of the express fibers which traverse the hinge are bent about a radius of curvature smaller than the minimum bend radius for such fibers. Preferably, the bypass tray includes first mechanical means for passively holding the tray in an open deflected position so that it can be conveniently displaced from the optical couplers which it normally confronts so that optical fibers can be easily and conveniently inserted into or removed from any one of the optical couplers. Further preferably, the tray includes a further passive mechanical means, such as a latch, for normally storing the tray so as to be parallel to and adjacent a wall of the housing containing the optical couplers so that the tray can normally act as a dust cover for the optical couplers.

Further advantageous features of the card cage of the invention include the provision of molded flexible clips at an upper end of the housing adjacent to the longitudinal channels for accommodating the various boards, the flexible clips being constructed so as to normally have a hooked end disposed over a top edge of one or more boards contained within the card cage so as to keep the boards in place, even during vibration loads. The clips are flexible such that they can be deflected away from a particular board so as to allow that board to be easily slideably removed from the card cage, or alternatively slideably inserted into the card cage.

Yet a further feature of the invention is the provision of means for releasably snap fitting and attaching the card cage housing to a card cage base, a preferred embodiment of the snap fitting means comprising two elongated flexible tines which extend from the base, the housing having first and second channels for guiding and receiving the first and second tines respectively, the tines and channels including a snap engaging and disengaging structure formed thereon.

These and other objects of the invention will be appreciated by reference to the attached drawings and detailed description.

DESCRIPTION OF THE PREFERRED EMBODIMENTS

Figure 1:
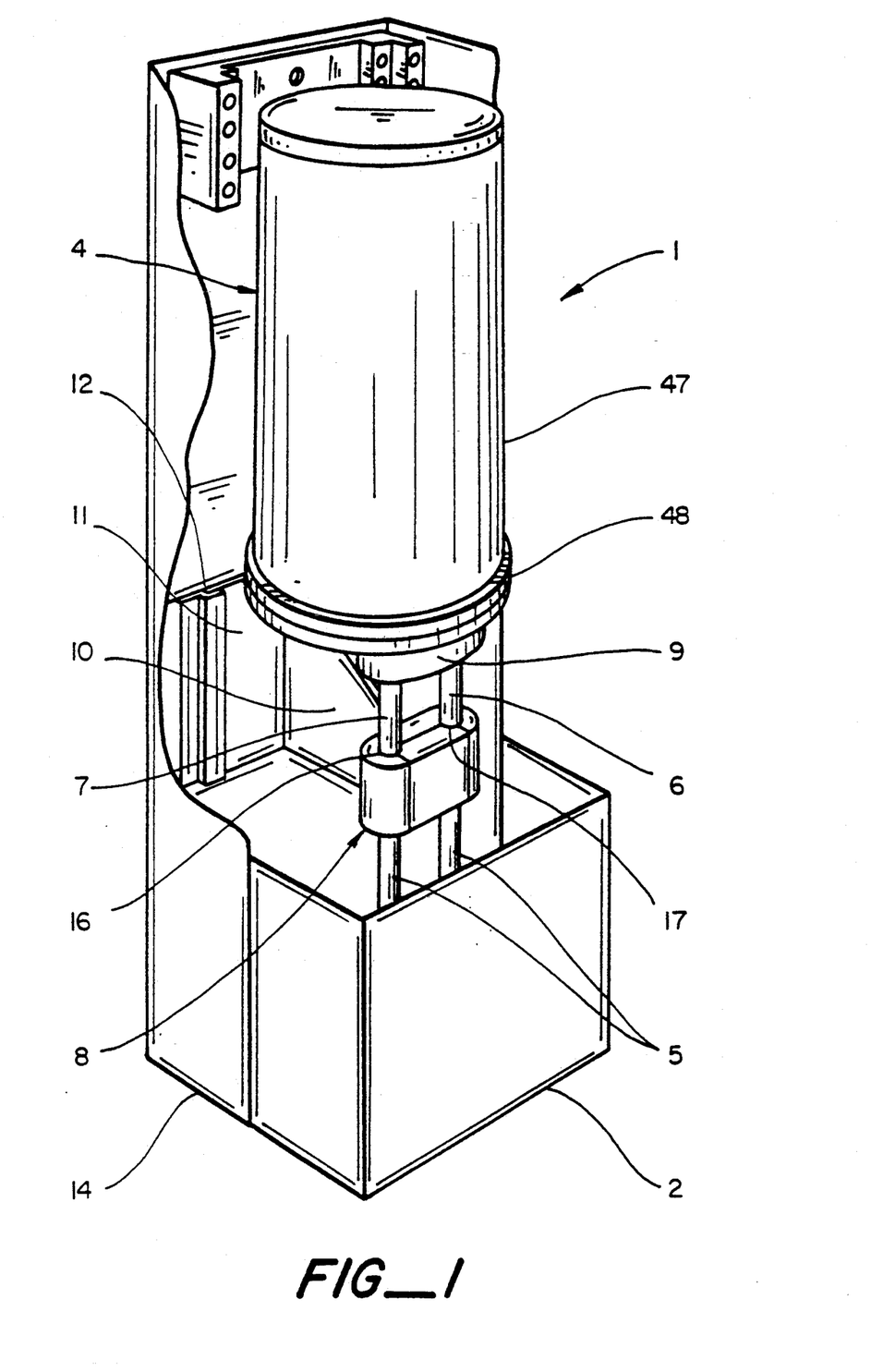
FIG. 1 illustrates a pedestal optical fiber closure for use with the invention.

FIG. 1 illustrates a pedestal optical fiber closure 1 which includes a pedestal 2 which normally encases and encloses an optical fiber closure 4, a preferred construction of the closure 4 being further described in abandoned U.S. application Ser. No. 121,527 abandoned in favor of U.S. Ser. No. 11,051 which was abandoned in favor of U.S. Ser. No. 262,067 which issued as U.S. Pat. No. 4,913,522, the disclosure of which is incorporated herein by reference. The pedestal includes a front upper cover, which exposes the closure 4 when removed. First and second optical fiber cable sections 6, 7 of fiber cable 5 are preferably held in place by optical fiber cable holder 8 which is preferably attached to a slideable bracket 10 which has an end face 11 which can slide in a vertical direction within channel 12 located on opposite sides of the end face 11. The holder 8 is preferably a hard rubber material member with first and second apertures 16, 17 which clamp onto and hold the cable sections 6, 7. In FIG. 1, a side portion of the pedestal is shown broken away and the top front cover therefor has been removed to show the contents within the pedestal. The optical fiber cable sections 6, 7 and 5 are of the type that comprise a plurality of sheaths and preferably at least one shield, the cable having an internal longitudinal strength which is sufficient to normally support the vertical weight of the holder 8, the cable seal 9, the closure 4, the bracket 10, as well as the cable sections 5, 6, 7 within the pedestal 2; the internal longitudinal strength of the cable being aided of course by frictional engagement between the end face 11 and the channels 12.

In use, the pedestal optical fiber closure 1 normally rests on the ground, and the optical fiber cable sections 6, 7 enter the closure 1 from beneath a closure bottom surface 14. Preferably, prior to entering and connecting couplers to optical fibers within the cable sections 6, 7 and securing the couplers within the closure 4, the first and second cable portions 6, 7 are secured to the holder 8 and held by the bracket 10 to facilitate working with the cable by a craftsman. Thereafter, a portion of the cable is stripped of its sheath and shield layers and communication media therewithin, e.g. optical fibers or electrical wires, are separated and coupled to and the stripped cable portion is then entirely sealed within the closure 4. After appropriate coupling is accomplished with fibers or wires within the cable sections 6, 7 and the closure 4 is assembled and sealed, the slideable bracket 10 allows the pedestal optical fiber closure 1 to reliably protect the cable 5 in freeze/thaw environmental conditions. More specifically, in colder months when a ground level beneath the pedestal bottom surface 14 freezes, the pedestal is normally urged upward very gradually over time in a vertical direction. Since the optical fiber closure 4 is totally supported by the slideable bracket 10 and holder 8, the pedestal 2 is allowed to move vertically relative to the closure 4 so as to prevent any undue stress or strain being induced to the fiber cable 5 as the pedestal 2 rises during a freezing period and alternatively falls during a thawing period.

Figure 2:
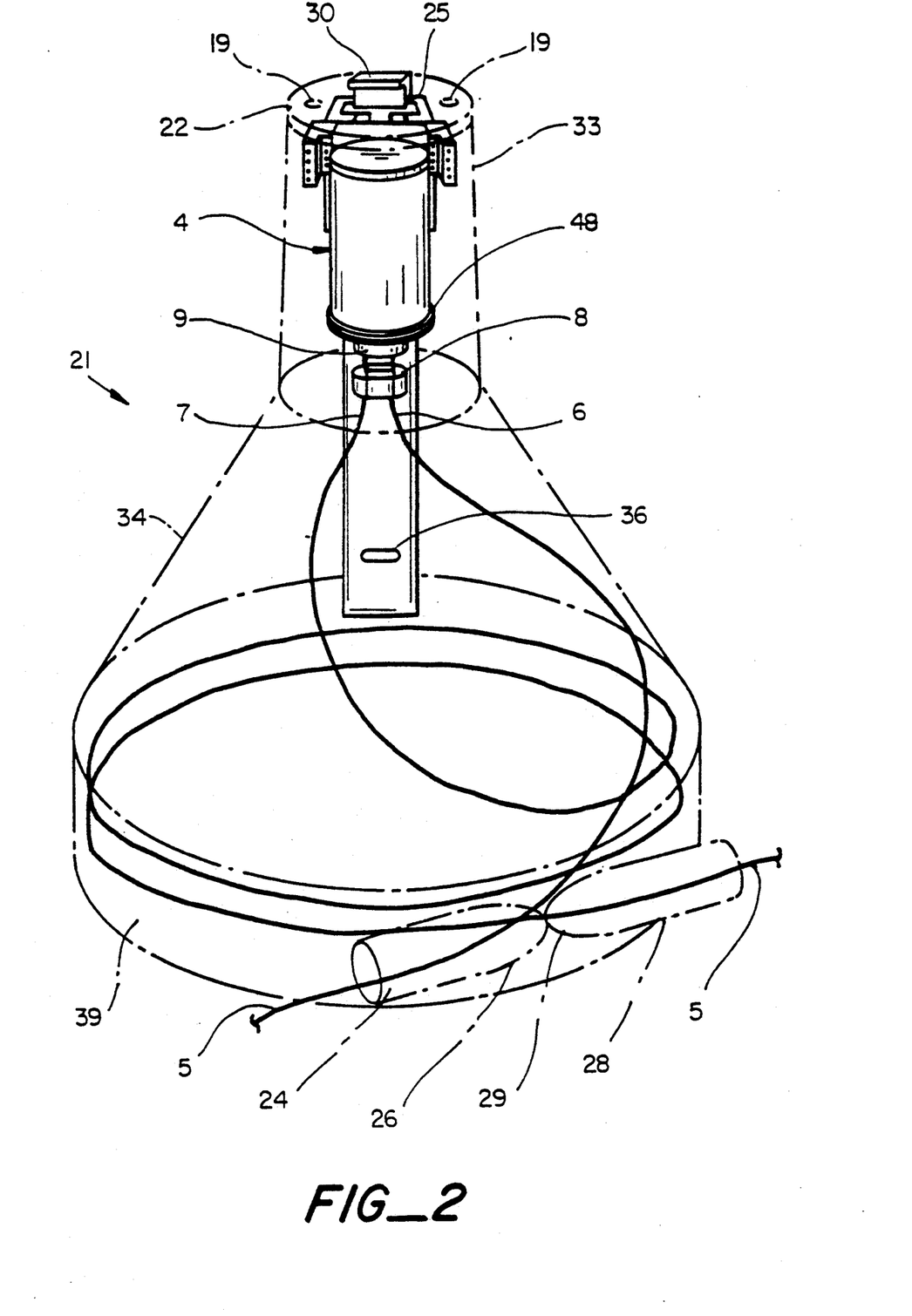
FIG. 2 illustrates a buried optical fiber closure for use with the invention.

In FIG. 2, reference numeral 21 illustrates a buried optical fiber closure. According to this embodiment, upper closure face 22 is intended to be substantially coplanar with a ground surface and preferably has holes 19 therein for aiding in removing the upper closure face. A remainder of the closure 21 is intended to be beneath ground level.

An optical fiber cable 5 enters the closure 21 through a tubular inlet 24 which has an opening which is essentially tangential to a circumferential surface 26 of the closure 21. Similarly, tubular outlet 28 has an end 29 which extends along a direction which is essentially tangential to the circumferential surface 26 which allows the cable 5 to exit the closure 21. Between entering the closure 21 via the inlet 24 and exiting via the outlet 28, the cable 5 is allowed to freely loop around an interior section of the circumferential surface 26, with cable sections 6, 7 extending upward within the closure so as to be enclosed by the closure 4. Again, as in the embodiment of FIG. 1, a cable holder 8 is preferably used for holding the first and second cable sections 6, 7 to facilitate working on an intermediate cable section prior to enclosing same within the enclosure 4 during cable installation. In this embodiment, normal gravitational support for the closure 4 is provided by the interengagement of a lower substantially flat surface 25 of a handle 30 and an upper substantially flat surface of a back member 38 which interconnects the rails 32, the handle 30 being shown only in FIG 2 and omitted in FIG. 3 for purposes of clarity. Accordingly, to vertically raise the first closure 4 from the second closure 21, a craftsman simply grabs the handle 30 with his fingers and lifts upward thus causing plate 31 to slide within rails 32. Preferably, the closure 21 has holes (not shown) for drop cables to enter and exit at any convenient location.

Figure 3:
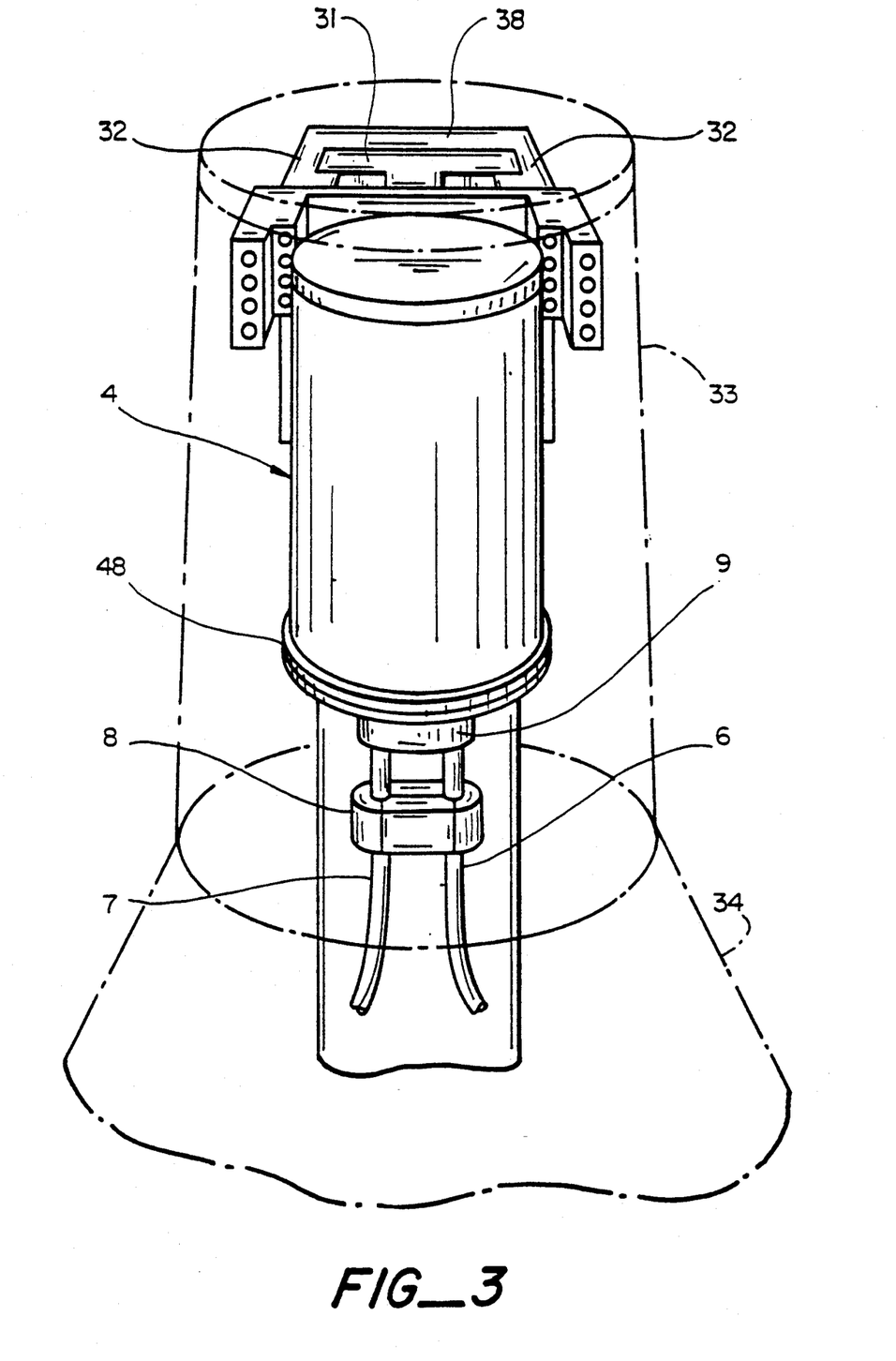
FIG. 3 illustrates an enlarged section of the buried closure illustrated in FIG. 2 and more clearly shows details of a sliding rail and channel arrangement contained therein.
Figure 4:
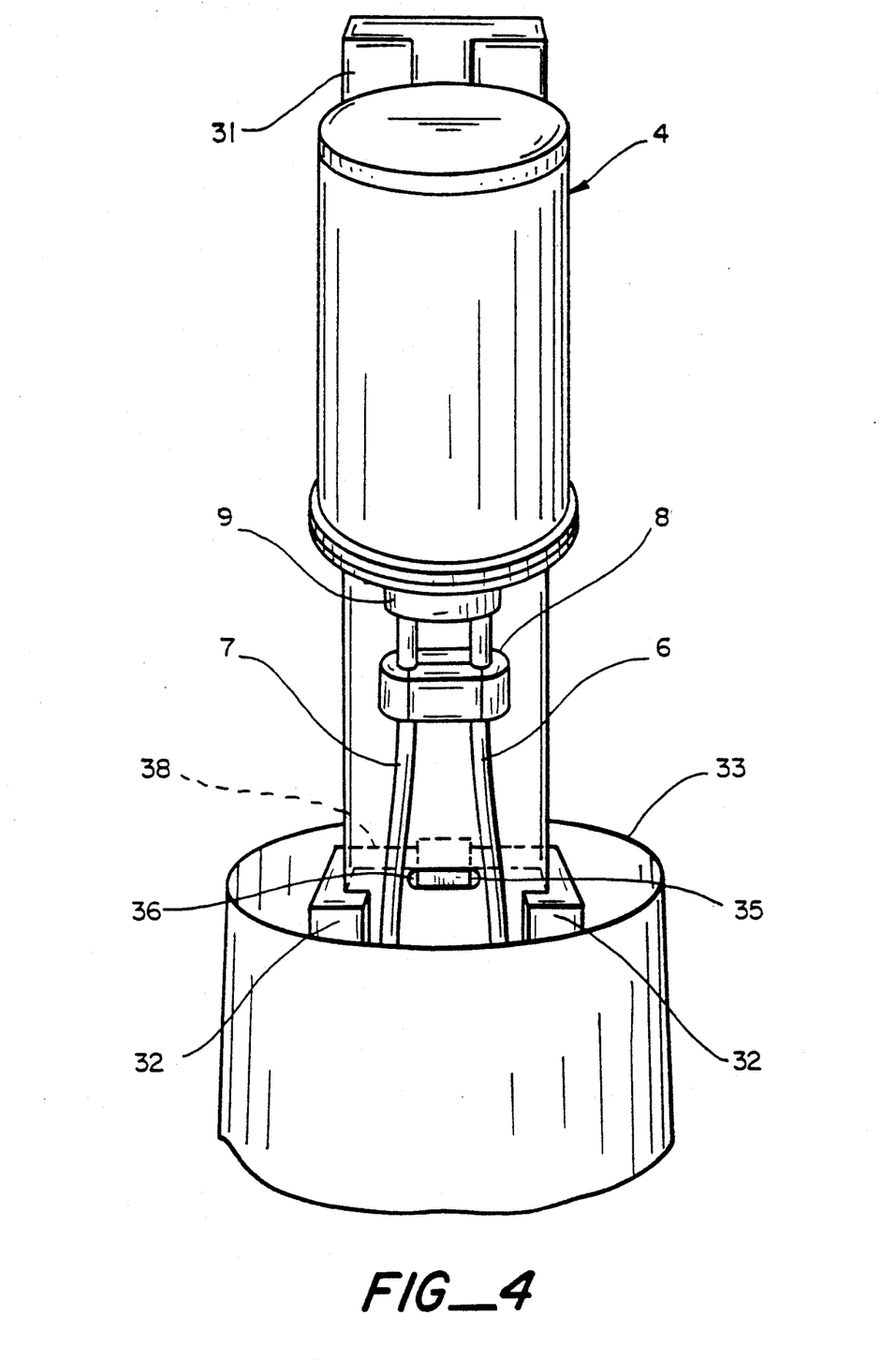
FIG. 4 illustrates a state of the buried enclosure in FIG. 2 where a first closure housed therewithin is vertically extended therefrom for ease of working on cables to be contained within the buried enclosure.

To facilitate working on this intermediate cable section during a field installation procedure, according to the invention the closure 4 is slideable mounted to the closure 21 via the slideable plate 31 which is slideably within the closure rails 32, the plate 31 being secured to the closure 4, as illustrated in FIG 3. Accordingly, to easily work on the closure 4 all a craftsman needs to do is raise the closure 4 vertically due to the sliding interengagement of the plate 31 and rails 32 so that the closure 4 resides an appropriate distance above ground level, and secure the closure 4 thereat with a suitable pin 35 disposable in pin slot 36 or other support means, as illustrated in FIG. 4, a part of the pin then being wedged against the member 38. As illustrated in FIG 2, preferably the buried optical fiber closure 21 includes a substantially cylindrical section 33 which rests above and is integrally connected with a substantially conical section 34 which is connected to a cylindrical base section 39.

Figure 5:
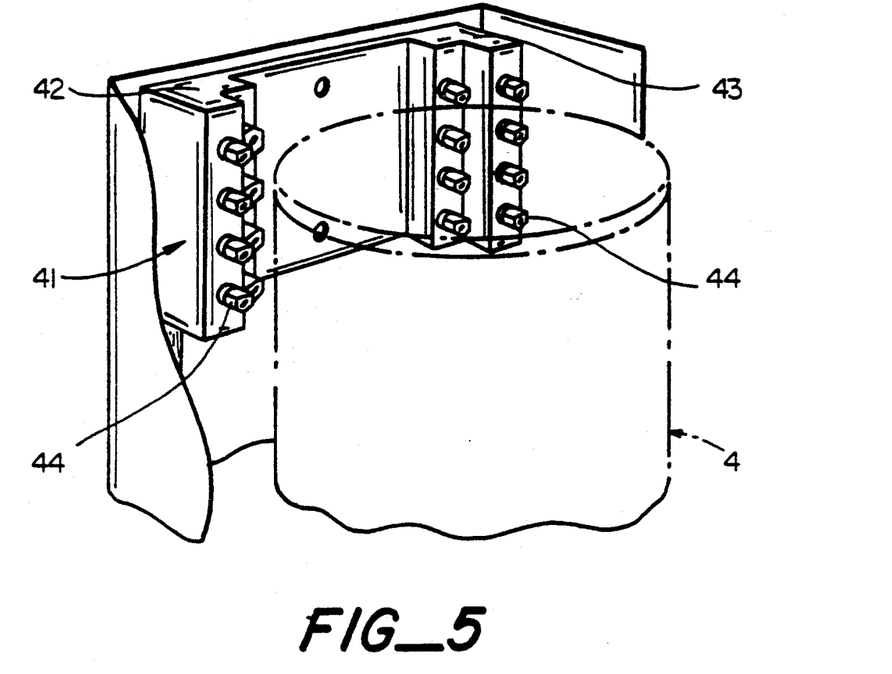
FIGS. 5 and 6 illustrate detailed perspective details of a preferred terminal block for use with the invention.
Figure 6:
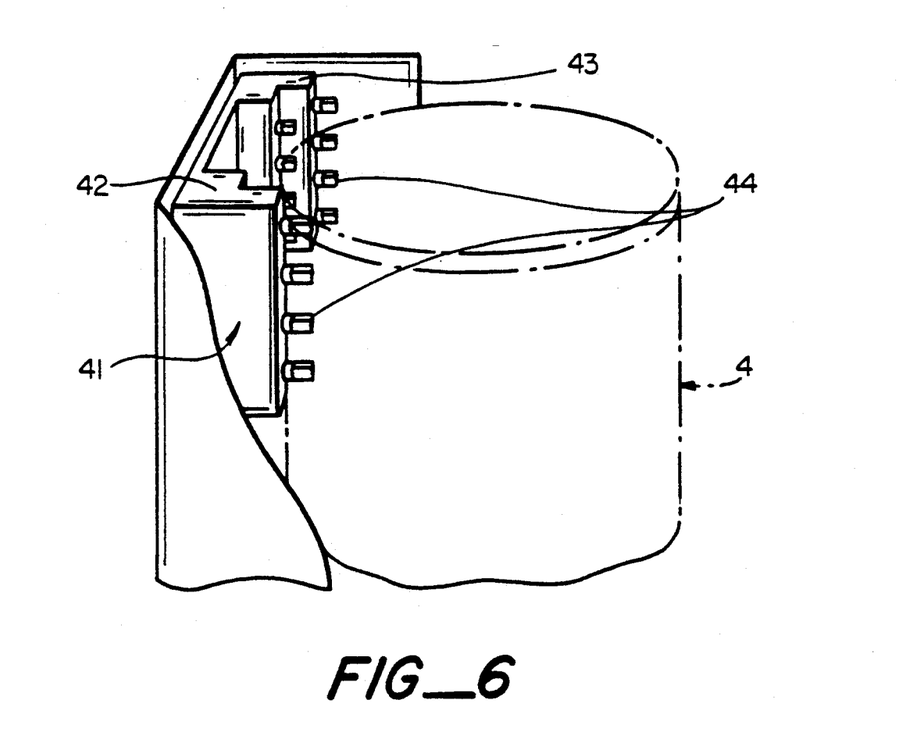

FIGS. 5 and 6 illustrate two perspective views of a preferred terminal block construction illustrated in FIGS. 1 and 2. According to these figures, a terminal block 41 includes first and second sets of terminals arranged in rows and located adjacent to opposite side ends of the pedestal or closure, e.g. either the pedestal closure 1 or the buried closure 21. Preferably, each terminal set 42, 43 includes first and second adjacent rows of terminals, as illustrated, with the rows being recessed relative to one another, as illustrated. Such a construction allows for, in the example illustrated, 16 terminal connections to be made with the 16 individual terminals 44 for connecting to electrical dropwires which are connected within the closure 4. Stacking and offsetting the sets of terminals as illustrated allows the terminals to be most easily accessible to a craftsman while allowing minimum interference to occur between the closure 4 and the various terminals 41 so as to facilitate installation and connection of the closure 4. Alternate placement of the terminals is possible, one such location would be adjacent the base plate 48 and the terminals could be connected to the base plate as well.

Figure 7:
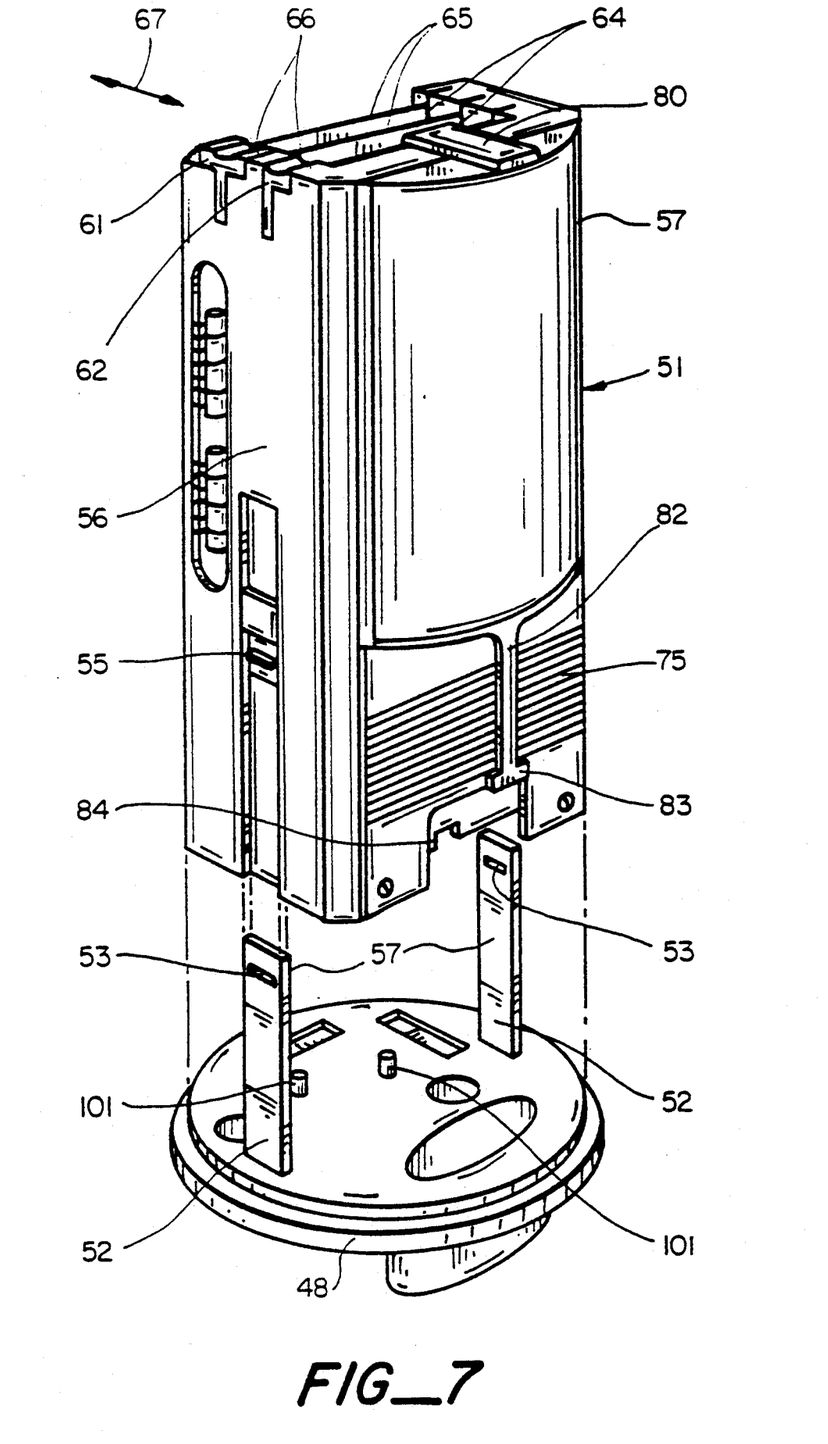
FIGS. 7-9 illustrate detailed features of an optical fiber card cage preferably disposable within the closures of FIGS. 1 and 2.

Referring back to FIG. 1, the closure 4 includes a dome 47 connectable to the closure base plate 48. Within the dome 47, as illustrated in FIG. 7, is contained card cage 51, preferably for housing optical and electrical components, the cage being releasably securable to the base plate 48 via engageable and disengageable spring clamp tines 52 which have a longitudinal slit 53 near an upper end thereof which is engageable with a protruding rail 55 which protrudes from opposite sides 56, 57 of the card cage 51. According to this construction, the card cage 51 and spring clamp tines 52 are sized such that the tines 52 must be resiliently urged outward away from each other to allow the card cage rails 55 to ride over and down an inner side surface 57 of the tines 52, the tines being guided by channels formed on exterior surfaces of the card cage housing. The rails 55 mate within the longitudinal slits 53 near the top of the tines 52. Accordingly, this construction allows for the card cage 51 to be easily attachable to the closure base plate 48 without requiring the use of bolts, screws, or other cumbersome items by a craftsman.

A further novel feature of the card cage 51 is the provision of integrally molded spring clamps 61, 62 preferably located on one of the sides 56, 57 of the card cage at an upper end thereof, as illustrated in FIG. 7. The card cage 51 has a plurality of opposing vertically oriented longitudinal channels 64 which slideably guide and hold various boards or cards 65 within the card cage 51. Each card or board 65 can preferably have mounted thereon electronic and/or optical circuitry and power modules as necessary for operation of various electro-optical components to be housed within the card cage 51. Specifically, according to a preferred embodiment, boards 65 could have mounted thereon circuitry for providing digital-to-analog and analog-to-digital operations, power and power conversion operations, packet assembly and disassembly functions, etc. Upper side ends 66 of the spring clamps 61, 62 are precisely positioned over an approximate top of longitudinal channels 64 so as to normally contain the cards 65 within the channels 64 and keep them from being inadvertently removed from the card cage 51. Upon sidewards deflection of the spring clamps 61, 62 along a direction of the arrows 67 an end 65 of the spring clamps 61, 62 is deflected off center from an upper edge of its respective longitudinal channel 64 so as to allow a board 65 to be inserted or removed from its respective longitudinal channel pair 64. Since the spring clamps 61, 62 are integrally formed by molding with a material which otherwise forms the housing of the card cage 51, the described construction provides for a cost efficient closure which is easily manufacturable and which is easily useable by a craftsman since use of external removeable clamps is not required, or any other separate securing or clamping means for that matter which can easily be dropped.

Figure 8:
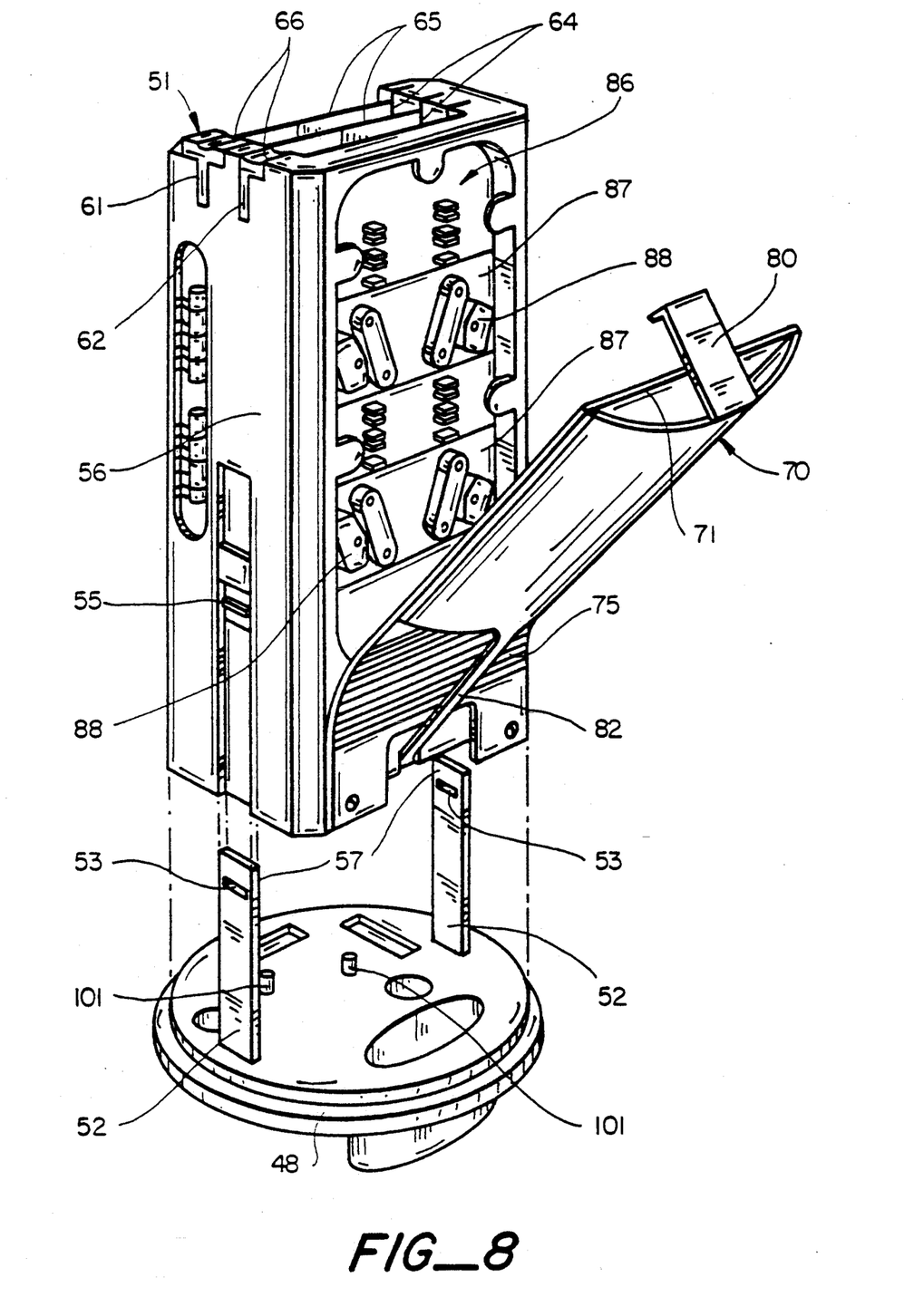
Figure 9:
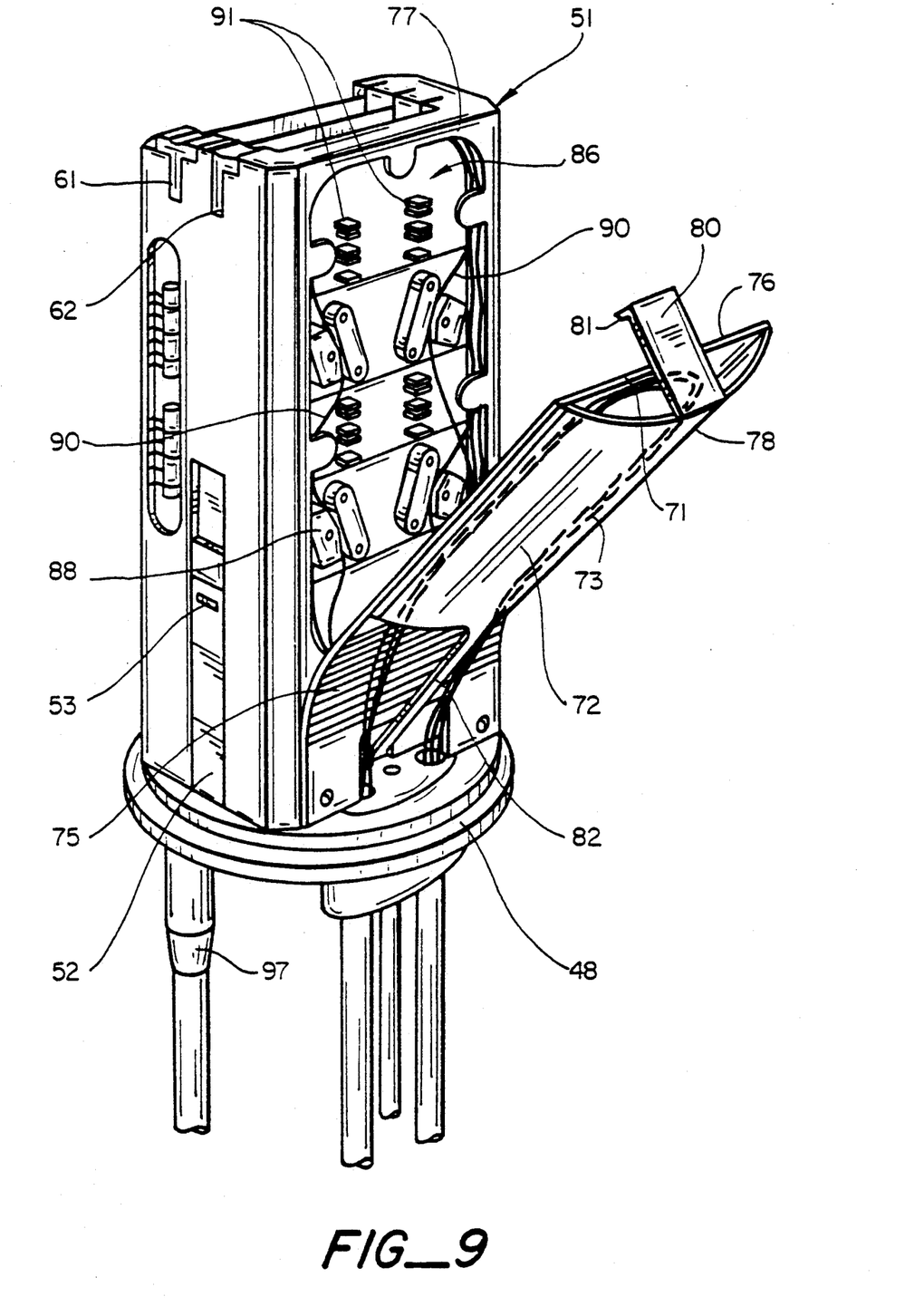

FIG. 8 shows yet further features of the invention, this figure showing the card cage 51 in an attitude whereby an end face 70 has been deflected from a body of the card cage. As FIG. 9 shows, the end face 70 comprises a tray 71 which contains an optical fiber or fiber tube storage surface 72 thereon for accommodating and storing bare optical fibers or optical fibers housed loosely within tubes 73, the bare fibers or loose tube fibers not being optically or electrically connected to components within the card cage 51. Hence, these fibers and/or tubes are expressly routed.

In the embodiment of FIG. 9, a loose tube fiber configuration is actually illustrated, these tubes being typically used in optical fiber cable constructions of the type wherein the fibers are loosely contained within tubes which are then environmentally sealed by various cable layers therearound. Other typical optical fiber cable constructions, such as a slotted core type, contain bare optical fibers typically helically wound within slots of a core of a cable, the slots and fiber then being environmentally sealed by various cable layers therearound. In either case, the card cage 51 is useable with such cables, and in the case of the loose tube cable type, it preferably would be the loose tubes which are expressly routed within the surface 72 of the tray 71; and in the case of the slotted core cable it would be bare buffered fibers which are routed within the surface 72 of the tray 71. Optionally, with bare fibers from a slotted core, the express fibers could be stored in coupler tray 86. A typical optical fiber cable may contain somewhere of the order of 10-200 individual fibers therein, and it may only be desirable or necessary to optically couple to only a fraction of the fibers within the cable. Accordingly, fibers or fiber tubes not optically coupled to need to be routed within the closure 4 in a easily convenient manner, which is a function of the storage tray 71. In addition, the tray 71 could hold fiber splices, connectors, etc.

Another particularly advantageous feature of the storage tray 71 is the provision of essentially a plurality of horizontally aligned ribs or corrugations 75 which are separated from one another in a vertical direction as illustrated in FIGS. 7-9. The corrugations are sized and spaced such that upon deflecting an upper part 76 of the storage tray 71 away from an upper part 77 of the card cage as illustrated in FIG. 9, a minimum bend radius of any fibers or fiber tubes being expressly routed within the storage tray 71 is not less than a minimum bend radius specified for the optical fibers. The parallel ribs thus form an elongated flexible and resilient hinge. Preferably, the storage tray 71 further includes an outer concave shaped cover 78 which further protects the fibers or tubes 73, the outer cover 78 preferably but not necessarily being transparent.

A further advantageous feature of the storage tray is the provision of an integrally molded and formed attaching member 80 which has a hook end 81 which can snap attach to a body of the card cage 51 and keep the storage tray secured thereto so as to form an environmental dust cover for an optical coupler tray 86. Another feature of the storage tray 71 is the provision of a second attaching member 82 which has a bottom end 83 (FIG. 7) which has a T-construction which is engageable with a mating T-slot 84 formed in a bottom surface of the card cage 51. Optionally, the slot 84 could be an aperature in the wall of the card cage rather than in a side edge thereof. The provision of the second attaching member 82 allows the storage tray 71 to be positively and naturally secured in an open position so as to allow a craftsman easy and convenient access to the optical coupler tray 86 when installing optical fibers therein as to be further explained below. After the optical fibers to be coupled are appropriately mounted within the optical fiber coupler tray 86, the T-shaped bottom end 83 is disengaged from its T-slot 84 and the hooked end 81 of the attaching member 80 is firmly secured to the card cage body so as to environmentally seal the optical coupler tray 86. A preferred construction of the member 82 and mating slot 84 is to allow the storage tray to be passively rotated and held away from the card cage body by an angle in excess of 45°, 50°, 60°, 75°; at least in excess of 30° or 40°, relative to a vertical axis of the card cage, with the hinge resiliently urging the tray 71 toward the tray 86 and towards an express fiber storage attitude where the angle is thus 0°. Optionally the angle is about 75°.

The optical coupler tray 86 includes a plurality of optical coupler modules 87 on which are mounted one or more optical couplers 88. Preferably, the optical couplers have a construction as described in copending application Ser. No. 07/344,778 and assigned to the assignee of the invention, the disclosure which is incorporated herein by reference. Specifically, now U.S. Pat. No. 5,002,356 preferably the coupler couples light between an electro-optic transducer, e.g. emitter or detector, and a core of a fiber by passing the light through a side of a fiber cladding and buffer. Optical fibers 90 which are to be optically coupled are inserted into an appropriate optical coupler 88 so as to form a bend in the optical fibers 90 which allows light to either be coupled into or coupled out of a core of each coupled optical fiber as more fully explained in U.S. application Ser. No. 344,778, now U.S. Pat. No. 5,002,356 a bend radius within the coupler being far less than a minimum bend radius of the fiber, e.g. typically in the range of 2 mm to 15 mm. Preferably, a plurality of attachment sections 91 are provided which can accommodate optical fiber connectors or optical fiber splices which may be formed in the optical fibers 90 as can be necessary if one or more optical fibers 90 are inadvertently broken and thus required to be spliced or connected.

Figure 10:
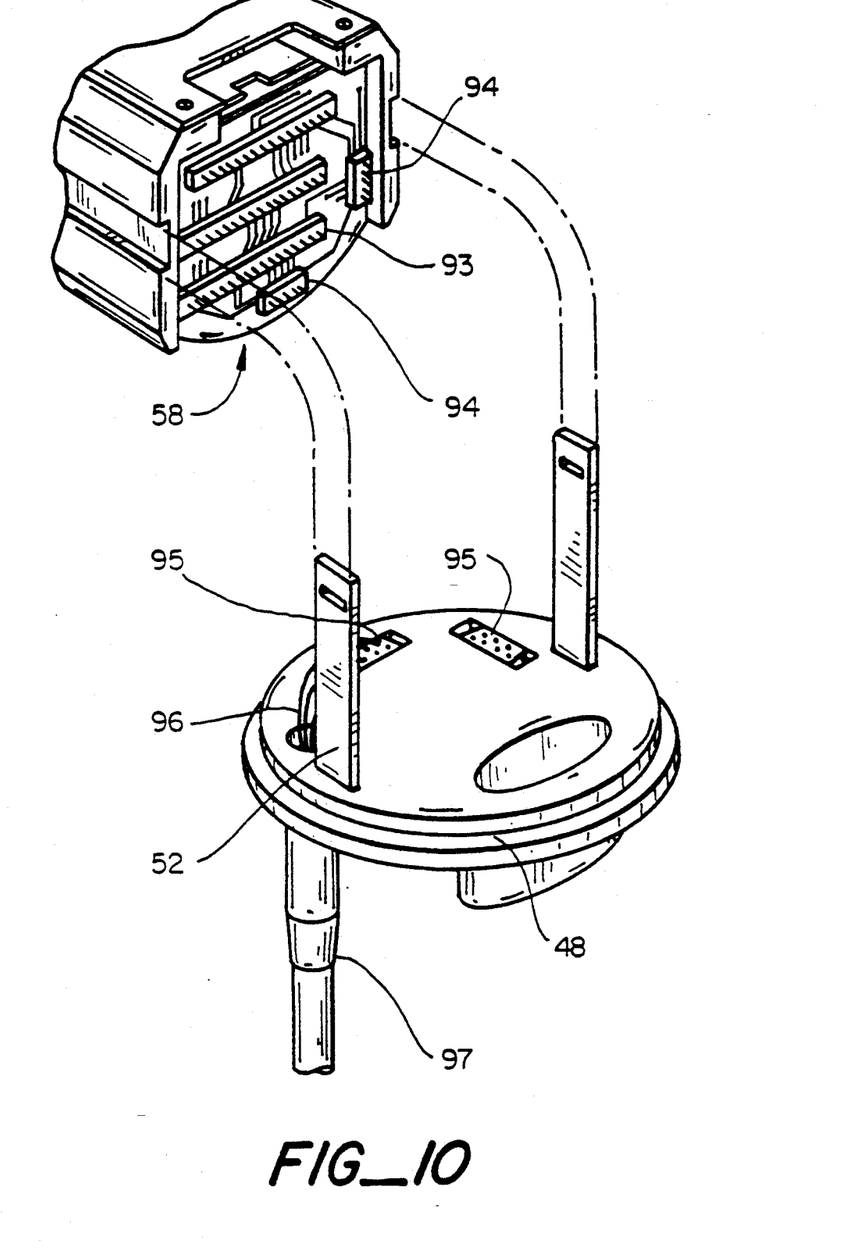
FIG. 10 illustrates details of a preferred test pin arrangement disposed on a bottom of the card cage of FIGS. 7-9.

FIG. 10 illustrates yet a further feature of the invention whereby a bottom surface 58 of the card cage 51 has a plurality of electrical test pins 93 extending in three adjacent vertical rows and extending from the bottom surface 58. Additional electrically connecting pin sets 94 are provided, these being engageable with mating electrical pin connectors 95 disposed on an upper surface of the base plate 48. Accordingly, when the card cage 51 is attached to the base plate 48, the electrical pin sets 94 mate with the electrical pin connectors 95 and provide electrical communication to a plurality of electrical dropwires 96 which then exit the closure 4 via conduit 97 and are terminated on various ones of the electrical terminals 44 illustrated in FIGS. 5 and 6. The significance of the electrical pin sets 93 is that they provide an easy, reliable, and convenient means of testing an electrical integrity of the card cage, cards, optical couplers, optical fibers, and other electronic components being housed within the card cage 51 at the time of its manufacture and prior to shipping for installation. Finally, FIG. 7 shows a preferred optional feature whereby posts 101 are provided in the base plate 48 for guiding the card cage into alignment with the base plate, the card cage bottom surface having mating post holes therein. Optionally, such post holes, not shown, are electrically connected to the backplane, and the posts 101 are electrically conductive and act as a ground for the card cage.

Though the invention has been described by reference to certain preferred embodiments thereof, the invention is not to be so limited and is to be limited only by the appended claims.

What is claimed is:

1. A card cage, comprising:
   a card cage housing, the housing including means for guiding a plurality of boards so they can be slideably inserted and removed from the housing;
   a backplane formed at an end of the guiding means so as to be connectable to at least one board when inserted into the housing;
   a plurality of electrical test connection pins exerting outward from the housing to enable testing of an electrical integrity of the backplane, the housing, and any boards disposed within the housing prior to electrically connecting the housing in an optical fiber telecommunications network.

2. The card cage of claim 1, further comprising a plurality of optical fiber attachments sections for attaching the optical fiber thereto.

3. The card cage of claim 2, the attachment sections being disposed along a common plane, the guiding means being aligned so that the plurality of boards can be contained within the housing so as to be substantially parallel to one another and substantially parallel to the common plane, at least one of the boards including electrical circuitry thereon.

4. The card cage of claim 3, the pins extending from a side of the card cage along a direction substantially parallel to the common plane and from a face of the housing which is substantially perpendicular to the common plane.

5. The card cage of claim 1, further comprising a card cage base plate, and second means for guiding the housing into proper electrical engagement with the base plate, the second guiding means electrically grounding the backplane to the base plate.

6. A card cage, comprising:
   a card cage housing, the housing including means for guiding a plurality of boards so they can be slideably inserted into and removed from the housing;
   means for attaching at least one optical fiber to the housing;
   means for storing an excess length of the at least one optical fiber such that the fiber excess length is not bent about a radius of curvature which is less than its minimum bend radius the storing means being disposed along a wall of the card cage housing to which the attaching means is secured;
   an optical fiber bypass tray for storing a length of one or more express optical fibers not to be attached by the attaching means, the bypass tray including a flexible elongated hinge near one end thereof which is elongated an amount sufficient such that the storage tray can be bent about an angle in excess of 45° and not cause any fibers extending lengthwise so as to traverse the hinge to be bent about a radius of curvature less than a minimum bend radius for the express fibers.

7. The card cage of claim 6, the fiber bypass tray having a fiber storage attitude such that the tray is adjacent to and serves as a cover for the at least one optical fiber.

8. The card cage of claim 7, further comprising first mechanical means for passively holding the tray in an open position whereat the hinge is resiliently deflected about an angle in excess of 45° so as to expose the attaching means, the hinge when deflected imposing a force tending to move the tray to its fiber storage attitude.

9. The card cage of claim 8, the first mechanical means comprising an elongated T-bracket attached to and extending from the bypass tray so as to traverse the elongated hinge, and a mating T-slot located on a surface of the housing in a vicinity of an end of the elongated hinge for accommodating a T-shaped end of the T-bracket.

10. The card cage of claim 6, the tray including second mechanical means for passively attaching the tray to the housing so as to secure the tray in its fiber storage position.

11. The card cage of claim 6, the tray including a second cover which covers an outside surface thereof, the second cover having a concave shape and being substantially transparent.

12. The card cage of claim 6, further comprising means for securing at least one optical fiber coupler to the housing, the coupler being capable of coupling light between a core of an optical fiber and an electro-optic transducer.

13. The card cage of claim 6, the express fibers being loosely held in one or more tubes and being stored on the tray while in the one or more tubes.

14. The card cage of claim 6, the express fibers being exposed while being stored on the tray.

15. A card cage, comprising:
a card cage housing, the housing including means for guiding a plurality of boards so they can be slideably inserted into and removed from the housing, the housing being formed by molding so as to have integrally formed therein at one end of the guiding means at least one flexible clip, the clip having a hooked upper end such that when in its rest position the clip end confronts an end of a board disposed within the housing and prevents the board from being removed from the housing, the board being removable from the housing and insertable into the housing by resiliently deflecting the clip.

16. The card cage of claim 15, the clip being resiliently deflectable along a direction substantially perpendicular to a lengthwise direction of the guiding means.

17. The card cage of claim 15, the guiding means comprising a plurality of opposing paired longitudinal channels, each channel pair being sized so as to receive and guide opposite lengthwise edges of a board to be insertable and removeable therefrom.

18. The card cage of claim 15, further comprising a plurality of boards at least one of which includes electrical circuitry thereon, the boards being insertable and removeable from at least one of the channel pairs.

19. A card cage, comprising:
a card cage housing, the housing including means for guiding a plurality of boards so they can be slideably inserted and removed from the housing;
a card cage base having at least one cable outlet capable of receiving an optical fiber cable therethrough;
means for releasably snap fitting and attaching the card cage housing to the base.

20. The card cage of claim 19, the snap fitting means comprising first and second deflectable tines extending from the base, the housing having first and second channels for guiding and receiving the first and second tines respectively, the tines and channels including a snap engaging and disengaging structure formed thereon.

* * * * *

UNITED STATES PATENT AND TRADEMARK OFFICE
CERTIFICATE OF CORRECTION

PATENT NO. : 5,261,024
DATED : Allen et al.
INVENTOR(S) : November 9, 1993

It is certified that error appears in the above-indentified patent and that said Letters Patent is hereby corrected as shown below:

Column 3, line 30, replace "121,527" by --721,527--.

Column 3, line 31, replace "11,051" by --110,051--.

Signed and Sealed this

Thirteenth Day of September, 1994

Attest:

BRUCE LEHMAN

*Attesting Officer*    *Commissioner of Patents and Trademarks*